UNITED STATES PATENT OFFICE.

ERWIN KLEIN, OF VOSLAU, NEAR VIENNA, AUSTRIA.

PROCESS OF PREPARING DRIED YEAST.

1,420,557.         Specification of Letters Patent.   Patented June 20, 1922.

No Drawing.      Application filed March 24, 1922.  Serial No. 546,501.

*To all whom it may concern:*

Be it known that I, Dr. ERWIN KLEIN, chemical engineer, a subject of the Kingdom of Roumania, residing at Voslau, near Vienna, in the Republic of Austria, have invented new and useful Improvements in a Process of Preparing Dried Yeast, of which the following is a specification.

My invention relates to improvements in the manufacture of pressed yeast and more particularly to improvements in drying such yeast.

It has already been proposed to dry pressed yeast by previously suspending yeast in water and by subsequently adding sugar, starch or substances containing starch, such as corn-flour, malt and the like, whereupon after aerating and squeezing out the solution thus obtained, the yeast is dried.

In order to conserve the energy of the yeast and to prevent a subsequent acidification it has been recommended to add, prior to the drying operation, ashes or bicarbonate of soda to the yeast squeezed out, or to add alcalies to untreated yeast, and furthermore it has also been proposed to mix the yeast with dehydrating or water-absorbing substances such as starch, malt extract, silicious marl or with small quantities of sugar or such large quantities of sugar so as to obtain a liquefaction of the yeast whereupon after squeezing, drying is carried out.

Finally, methods are known for conserving already dried yeast employing hygroscopic substances, such as calcium chloride ($CaCl_2$) which are not mixed with the yeast, but kept away from it.

The object of all processes of the kinds above referred to is to conserve or to magnify the energy or activity of the yeast by adding thereto prior to or after the drying, certain substances, but no attention was paid to the fact that the physiological properties of the yeast undergo changes during the drying operation so that the additional substances are not appropriate to the actual state of the yeast. Essential disadvantages result from this fact, as the additions must be made in unnecessarily large quantities or even in quantities detrimental to the final product in order to be adapted to the state of the yeast when adding such substances although during the progressive drying, such quantities of added substances are at least an unnecessary burden or disturbance.

The essence of my invention consists in adding these known additional substances, instead of prior to or after the drying, during the drying process in such a manner that they are well adapted to the actual physiological state of the yeast, thereby securing the greatest efficiency with the least amount of such additional substances.

Furthermore a product is obtained which is superior in its activity and efficiency to the known pressed yeast. According to my invention it is possible to produce durable dry yeast having a far higher percentage of water than hitherto possible without injuring its durability. The process may be carried out in such a manner that the critical stage of the drying is overcome as quickly as possible, the critical stage being that in which the percentage of water in the treated yeast allows of the proteolytic enzymes acting in the most violently destructive manner on the fermenting enzymes; this critical percentage of water depends on the actual physiological state of the yeast and on the temperature and is of about 60 to 50%; to get over this critical stage, water-absorbing or dehydrating substances such as flour, starch and the like are added to the yeast previously dried to a percentage of water of about 60% which is then, as stated, near the critical stage above mentioned, these water-absorbing or dehydrating substances being preferably previously dried and pre-heated. Nitrogenous substances at this moment cannot leave the yeast because of the physical conditions being not given then, whereas with the known prior treatment of the yeast, nitrogenous substances can leave it in consequence of the presence of water and air in large quantities. The addition of starch or such equivalent substances is made in such quantities depending on the nature of the yeast that the percentage of water of about 60 to 50% is lowered to about 30% after carrying out this stage of the drying process, for example by means of a current of air. The quantity of the substances employed may vary between 50% and 100% of the weight of the yeast according to the nature of the yeast.

The addition of yeast in this stage is especially advantageous because the yeast, besides water, gives off to the starch other secretions which are important for the durability of the dried yeast having a higher percentage of water. Obviously among these products of secretion, the properties of which depend on the physiological state of the yeast, at which the addition of starch is carried out, there are some which act antiseptically and prevent a subsequent acidification.

The drying of the yeast by the action of air, eventually in combination with the action of water-absorbing substances, such as starch or the like, having reached the state of being below the critical percentage of humidity, i. e. having reached about 30% moisture content, then preferably substances are added which conserve the fermenting properties of the yeast, for example phosphate of potassium or sugar alone or in combination. The drying process may furthermore be facilitated by the addition of substances such as common salt and the like, which accelerate the dehydration or passage of the water through the walls of the cells of the yeast.

When adding sugar to yeast of about 40 to 20% of humidity, it has the best effect because the sugar, besides accelerating the passage of the water out of the cells of the yeast has a stimulating action on the enzymes, producing in this stage of the yeast further fermenting enzymes. These newly formed enzymes cannot diminish on account of the rapidly decreasing percentage of water obtained by the continuation of the drying process, a diminishing of such enzymes being only possible with a higher percentage of water.

With a percentage of water of the yeast of about 40%, the passage of the water through the cells meets with such resistance that for a rapid drying, substances such as common salt, are necessary in order to effect this passage as rapidly as possible so that the proteolytic enzymes are not allowed to be active for too long a period on the fermenting enzymes.

Instead of sugar, in the broadest meaning of the word, other fermentable substances, such as dextrines or, generally speaking, any other materials containing fermentable substances may be employed. The sugar or the other material of similar action may be added in the proportion of about 2 to 5% of the weight of the treated yeast. On account of the action of the proteolytic enzymes on the fermenting enzymes being in this stage of the process no longer so violent, the temperature may be elevated.

Drying is then continued until the desired percentage of humidity is reached; this percentage may be higher than with yeast treated according to the known processes and may amount even to 15%, without injuring thereby the durability of the yeast. This is rendered possible by the intimate admixture of water-absorbing substances. Such a high percentage of water is desirable to have a yeast instantaneously ready for use.

If starch is added to yeast suspended in water or to untreated fresh yeast, this addition has not this above-described beneficial effect, the reason thereof being probably that the starch is saturated with substances (secretion products of the yeast) which act in specifically different manner in the different cases.

The preferred execution of the process according to my invention is as follows: The yeast preferably divided into small particles is dried by means of a current of air passing through the particles of yeast to the stage of the critical percentage of humidity of about 60 to 50%, then water-absorbing substances, such as starch, flour or the like, are added in such quantities that on account of their water-absorbing action the percentage of water rapidly diminishes below that critical stage, i. e. to a percentage of about 30%. With these substances the addition of substances like common salt or the like, accelerating the passage of the water through the walls of the cells of the yeast may be combined. To the yeast treated in this manner are either mixed substances conserving the fermenting enzymes, preferably phosphate of potassium, or sugar, which besides accelerating the passage of the water out of the cells, has a stimulating action on the fermenting enzymes, or both substances may be added; subsequently, drying of the yeast is finished by means of a current of air.

What I claim as my invention and desire to secure by Letters Patent is:

1. In the process of preparing dried yeast, the steps which comprise evaporating moisture from the yeast until its moisture content is reduced to a critical stage at which enzymic decomposition tends to take place, and before such decomposition has occurred to such an extent as would substantially impair the quality of the yeast, mixing with the yeast a sufficient quantity of an innocuous substance having a high moisture-absorbing capacity to quickly reduce the moisture content of the yeast to a percentage so low as to be much less favorable to deleterious enzymic decomposition.

2. In the process of preparing dried yeast, the steps which comprise evaporating moisture from the yeast until its moisture content is reduced to about 50% to 60% and, before sufficient lapse of time to permit much enzymic decomposition after this moisture content is attained, mixing with the yeast a sufficient quantity of an innocuous substance having a high-moisture-absorbing capacity to reduce the moisture content of the yeast to a percentage so low as substantially to avoid deleterious decomposition, and thereafter continuing the drying until a durable dried yeast is obtained.

3. In the process of preparing dried yeast, the steps which comprise evaporating moisture from yeast until its moisture content is reduced to about 50% to 60%, then mixing the yeast with a sufficient quantity of an innocuous substance having a high moisture-absorbing capacity to effect a quick reduction of the moisture content of the yeast to about 30%, and continuing the drying until a durable dried yeast is obtained.

4. In the process of drying yeast, the steps which comprise evaporating moisture from yeast until its moisture content is reduced to about 50% to 60% and then mixing the yeast with a sufficient quantity of a moisture-absorbent amylaceous substance to effect a further reduction of the moisture content of the yeast to a percentage below that at which enzymic decomposition of the yeast readily occurs.

5. In the process of drying yeast, the steps which comprise evaporating moisture from the yeast until its moisture content is reduced to about 50% to 60% and then mixing the yeast with a sufficient quantity of relatively dry starch to effect a rapid reduction of the moisture content of the yeast to about 30%.

6. In the process of drying yeast, the steps which comprise evaporating moisture from the yeast until its moisture content is reduced to about 50% to 60% and then mixing the partially dried yeast with sufficient innocuous moisture-absorbing material to quickly reduce the moisture content of the yeast to about 30% and with an innocuous water-soluble substance promoting exosmosis of water through the cell walls of the yeast, and continuing the drying until a durable dried yeast is obtained.

7. In the process of preparing dried yeast, the steps which comprise evaporating moisture from the yeast until its moisture content is reduced to a critical stage at which enzymic decomposition tends to take place and, before such enzymic decomposition has occurred to such an extent as would substantially impair the quality of the yeast, then mixing with the yeast a sufficient quantity of a preheated innocuous substance having a high moisture-absorbing capacity to quickly reduce the moisture content of the yeast to a percentage so low as to be much less favorable to deleterious enzymic decomposition.

8. In the process of preparing dried yeast, the steps which comprise evaporating moisture from the yeast until its moisture content is reduced to about 50% to 60% and, before sufficient lapse of time to permit much enzymic decomposition after this moisture content is attained, mixing with the yeast a sufficient quantity of a preheated innocuous substance having a high moisture-absorbing capacity to reduce the moisture content of the yeast quickly to a material further extent.

9. In the process of preparing dried yeast, the steps which comprise subjecting yeast to the action of a drying gas until its moisture content is reduced to about 50% to 60%, then mixing with the yeast a sufficient quantity of starch to quickly absorb additional moisture from the yeast and thereby reduce its moisture content to about 30%, then adding sugar equivalent to 2% to 5% the weight of the yeast and continuing the drying until a durable dried yeast is obtained.

10. In the process of preparing dried yeast, the steps which comprise evaporating moisture from the yeast until its moisture content is reduced to about 60%, mixing the yeast having this reduced moisture content with such an amount of innocuous moisture-absorbent material as to reduce its moisture content still further to about 30% and then adding small quantities of sugar and salts having a protective action on the enzymes of the yeast and continuing the drying until a durable dried yeast is obtained.

11. In the process of preparing dried yeast, the steps which comprise evaporating moisture from the yeast until its moisture content is reduced to about 60%, mixing the yeast having this reduced moisture content with a sufficient amount of an innocuous moisture-absorbent material to quickly effect a further reduction of the moisture content of the yeast to about 30%, then adding small quantities of sugar and salts having a protective action on the enzymes of the yeast and accelerating the passage of water out of the yeast cells, and continuing the drying until the moisture content of the yeast is reduced to about 15% or less.

Dr. ERWIN KLEIN.

Witnesses:
 CARL WUDENHUP,
 JOHANN HUSS.